US007370418B2

(12) United States Patent
Ueda et al.

(10) Patent No.: US 7,370,418 B2
(45) Date of Patent: May 13, 2008

(54) METHOD OF MANUFACTURING A SHEET FEED ROLLER

(75) Inventors: Kazuo Ueda, Fukushima-ken (JP); Hisashi Takahashi, Fukushima-ken (JP); Hideshi Takahashi, Fukushima-ken (JP); Yuji Inada, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 549 days.

(21) Appl. No.: 10/865,151

(22) Filed: Jun. 10, 2004

(65) Prior Publication Data

US 2004/0259706 A1 Dec. 23, 2004

(30) Foreign Application Priority Data

Jun. 18, 2003 (JP) ............................ 2003-172929

(51) Int. Cl.
*B23P 17/00* (2006.01)
*B26D 3/08* (2006.01)

(52) U.S. Cl. ...................... 29/895.31; 29/725; 29/23.1; 492/31; 492/33; 492/36; 83/880; 72/76

(58) Field of Classification Search ............... 29/895.3, 29/895.31, 895.32, 725, 23.1; 492/28, 30, 492/31, 32, 33, 34, 35, 36, 37; 83/879, 880, 83/881, 882, 883, 885; 72/76; 226/193
See application file for complete search history.

(56) References Cited

U.S. PATENT DOCUMENTS 5,971,638 A * 10/1999 Sato et al. .................. 400/578
6,532,661 B2 * 3/2003 Tsukada et al. .......... 29/895.31
6,540,218 B2 4/2003 Tsukada et al.
2001/0021684 A1 9/2001 Tsukada et al.

FOREIGN PATENT DOCUMENTS

EP 0 832 835 4/1998
EP 0 861 798 9/1998
EP 0 925 946 6/1999
JP 08-086309 4/1996

(Continued)

OTHER PUBLICATIONS

Search Report dated Oct. 8, 2004 for European Patent Application No. 04 25 3540.

*Primary Examiner*—David P. Bryant
*Assistant Examiner*—Sarang Afzali
(74) *Attorney, Agent, or Firm*—Brinks Hofer Gilson & Lione

(57) ABSTRACT

Projections 4-formed on a circumferential surface of a roller portion of the sheet feed roller comprise straight grain projections whose projecting direction faces to the rotation direction of the roller portion, and reverse grain projections that are formed in a direction opposite to the surfaces of the straight grain projections. The straight grain projections are formed so as to be adjacent to each other in the axial direction of the roller portion, that is, in the direction of arrow B and are also formed in two or more rows in the circumferential direction of the roller portion, that is, in the direction of arrow A. The reverse grain projections are formed so as to be adjacent to each other in the axial direction of the straight grain projections and are also formed in the circumferential direction.

3 Claims, 9 Drawing Sheets

FOREIGN PATENT DOCUMENTS

| | | |
|---|---|---|
| JP | 09-188433 | 7/1997 |
| JP | 10-119374 | 5/1998 |
| JP | 10119374 | 5/1998 |
| JP | 10120233 | 5/1998 |
| JP | 10-231042 | 9/1998 |
| JP | 10231042 | 9/1998 |
| JP | 10235955 | 9/1998 |
| JP | 3271048 | 1/2002 |

* cited by examiner

ARRANGEMENT OF THE PROTRUSIONS FORMED BY A FIRST PROTRUSION FORMING OPERATION

ARRANGEMENT OF THE PROTRUSIONS FORMED BY THE FIRST AND SECOND PROTRUSION FORMING OPERATIONS

▲▼ : PROTRUSIONS FORMED BY THE SECOND PROTRUSION FORMING OPERATION

ARRANGEMENT OF THE PROTRUSIONS FORMED BY A CONVENTIONAL ART

METHOD OF MANUFACTURING A SHEET FEED ROLLER

This application claims the benefit of priority to Japanese Patent Application No. 2003-172929, herein incorporated by reference.

BACKGROUND OF THE INVENTION

1. Field of the Invention

The present invention relates to a sheet feed roller that is used for a printing apparatus, such as a printer, to appropriately carry sheets, such as recording papers, inserted between a pressure roller and the sheet feed roller, and to a method of manufacturing the same.

2. Description of the Related Art

As shown in FIG. 10, the conventional sheet feed roller 21 includes a cylindrical metal roller portion 22. On the circumferential surface of the roller portion 22, a plurality of projections with a predetermined height 23 is formed at predetermined intervals in the circumferential direction and the axial direction of the roller portion 22.

In such a conventional sheet feed roller 21, a pressure roller 24 is elastically forced against the circumferential surface of the roller portion 22 by a coil spring (not shown), and a sheet 25, such as a recording paper having a predetermined thickness, is inserted and pressed between the roller portion 22 and the pressure roller 24.

In this state, when the sheet feed roller 21 is rotated in the forward or reverse direction, the projections 23 grip the sheet 25 to reliably reciprocate the sheet 25 in a direction perpendicular to the printable surface of the paper.

When printing the desired image on the sheet 25, the sheet 25 is fed into a printing portion of a printing apparatus (not shown) by the rotation of the sheet feed roller 21, so that the desired image can be printed.

According to a method of manufacturing the projections 23, as shown in FIG. 11, a pair of punches 27 is mounted to a holder 26 so as to be opposite to each other. The gap between the pair of punches 27 is smaller than the diameter of the roller portion 22.

In addition, the sheet feed roller 21 is rotatably supported by a V-shaped supporting stand 28.

By repeatedly performing a punching operation in which the punches 27 raised to a raised position at a predetermined height are dropped to a position shown in FIG. 11, and a rotating operation in which the roller 21 is sequentially rotated by a predetermined angle in synchronism with the raising of the punches 27 to the raised position after the punching operation, a straight grain projection 23$a$ is formed by the punch 27 on the right side of FIG. 11, and a reverse grain projection 23$b$ is formed by the punch 27 on the left side of FIG. 11.

As shown in FIG. 13, the projections 23 are formed such that the pitch between adjacent straight grain projections 23$a$ in the axial direction (in the horizontal direction of FIG. 13) is P and that the reverse grain projections 23$b$ are formed between the straight grain projections 23$a$ in the circumferential direction, that is, in the vertical direction of FIG. 13.

Furthermore, the rotation angle $\alpha$ formed between adjacent straight grain projections 23$a$ in the circumferential direction is 6°, and the reverse grain projections 23$b$ are formed between the straight grain projections 23$a$ formed at the rotation angle of 6° in the circumferential direction and are also formed at a distance of P/2 from the straight grain projections 23$a$ in the axial direction.

That is, as shown in FIG. 13, the projections 23 are formed in a zigzag shape along the circumferential direction and the axial direction on the circumferential surface of the roller portion 22.

When the conventional sheet feed roller 21 having the above configuration is used for a printing apparatus, capable of performing color printing, such as a thermal transfer printer, the plurality of projections 23 grips both surfaces of the sheet 25, such as thick photographic paper. As a result, the sheet 25 is gripped and is carried reciprocatively. An ink layer of an ink ribbon (not shown) is thermally transferred to the reciprocating sheet 25, thereby printing the desired color image on the sheet 25.

According to the conventional sheet feed roller 21 having the aforementioned configuration, a grip force on the sheet 25 while it is being carried can be increased by changing the height of the projections 23 according to the thickness of the sheet 25, and thus the sheet 25 can be reliably carried.

[Patent Document 1]

Japanese Patent No. 3271048 (corresponding U.S. Pat. No. 6,532,661)

Japanese Patent No. 3352602

Japanese Unexamined Patent Application Publication No. 10-119374

However, as shown in FIG. 12, when the rotation angle $\alpha$ formed between adjacent straight grain projections 23$a$ in the circumferential direction is, for example, 6° and the height of the straight grain projections 23$a$ is increased, the punches 27 dropped according to the punching operation may interfere with the previously formed straight grain projections 23$a$ to cut the tops of the previously formed straight grain projections 23$a$.

Therefore, the plurality of projections 23 must have the height at which the punches 27 do not interfere therewith during the punching operation, or the rotation angle $\alpha$ must be increased. As a result, the number of projections 23 gripping the sheet 25 per unit area is decreased, and thus the grip force on the sheet 25 is decreased.

SUMMARY OF THE INVENTION

Accordingly, the present invention is designed to solve the above problems, and it is an object of the present invention to provide a sheet feed roller in which, even when the height of a plurality of projections is high or a rotation angle $\alpha$ formed between the projections is small, punches do not interfere with the projections at the time of forming the projections and thus the grip force of the projections on a sheet can be increased at the time of carrying the sheet, and a method of manufacturing the same.

As a first aspect to achieve the above object, the present invention provides a sheet feed roller formed by performing plastic working on a cylindrical metal roller such that a plurality of projections of a predetermined height is formed in the axial direction and the circumferential direction on an outer circumferential surface of the metal roller, wherein the projections comprises straight grain projections whose projecting direction is equal to a rotation direction of the sheet feed roller, and reverse grain projections whose projecting direction is opposite to the rotation direction of the sheet feed roller, and wherein the straight grain projections are adjacent to each other in the axial direction of the metal roller and are also formed in two rows or more in the circumferential direction thereof, and the reverse grain projections are adjacent to each other in the axial direction of the straight grain projections and are also formed in the circumferential direction thereof.

In addition, as a second aspect to achieve the above object, the straight grain projections and the reverse grain projections that are adjacent to each other in the axial direction are formed in a zigzag shape in which the projections are arranged at predetermined intervals in the axial direction and in the circumferential direction.

Further, as a third aspect to achieve the above object, a method of manufacturing a sheet feed roller according to the present invention comprises the steps of: providing a pair of punches composed of a first punch and a second punch, the first and second punches being opposite to each other at an interval smaller than the diameter of a cylindrical metal roller; repeatedly performing, in a state in which the metal roller is supported by a supporting stand, a first projection forming operation including a punching operation by the first and second punches and a rotating operation in which the metal roller is sequentially rotated by a predetermined angle in synchronism with the punching operation to form a plurality of projections in the circumferential direction and in the axial direction on the circumferential surface of the metal roller; and moving the metal roller in the axial direction by a predetermined distance after the first projection forming operation, and forming, by a second projection forming operation which is the same as the first projection forming operation, additional projections in the circumferential direction between the projections that are formed so as to be adjacent to each other in the axial direction by the first projection forming operation.

Furthermore, as a fourth aspect to achieve the above object, the projections formed by the first punch are straight grain projections whose projecting direction is equal to a rotation direction of the metal roller; the projections formed by the second punch are reverse grain projection whose projecting direction is opposite to the rotation direction of the metal roller; by the first projection forming operation, a plurality of the straight grain projections and the reverse grain projections is formed in the circumferential direction in a state in which the plurality of projections is adjacent to each other in the axial direction; and, by the second projection forming operation, additional straight grain projections or reverse grain projections are formed in the circumferential direction between the straight grain projections and the reverse grain projections that have been formed so as to be adjacent to each other in the axial direction by the first projection forming operation.

Moreover, as a fifth aspect to achieve the above object, the straight grain projections or the reverse grain projections additionally formed by the second projection forming operation are formed in a zigzag shape in which they are spaced from the straight grain projections or the reverse grain projections formed by the first projection forming operation in the axial direction and in the circumferential direction by predetermined intervals.

DETAILED DESCRIPTION OF THE EMBODIMENTS

Figure 1:
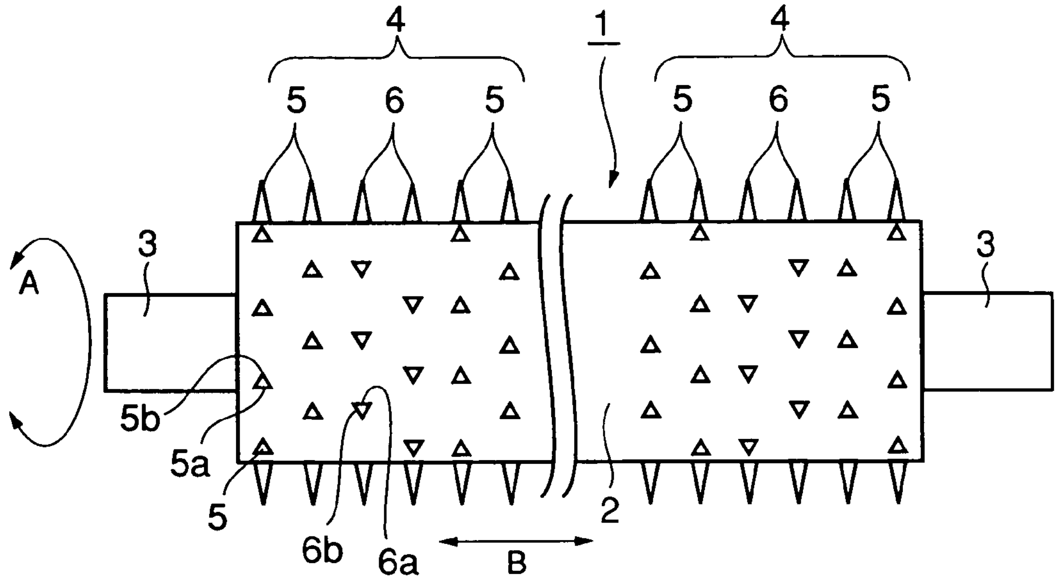
FIG. 1 is a front view of a sheet feed roller according to the present invention.
Figure 2:
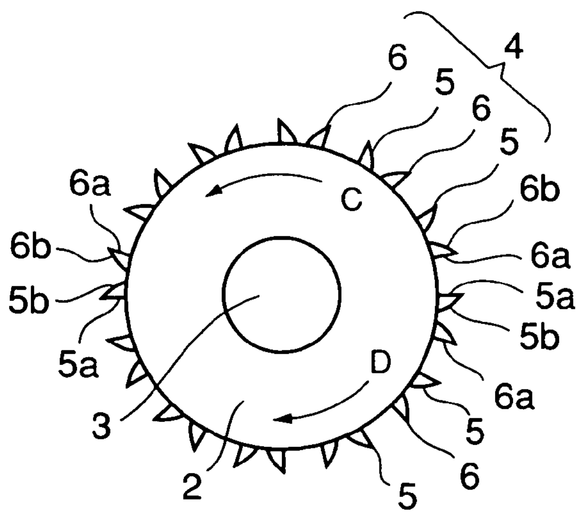
FIG. 2 is a side view of the sheet feed roller shown in FIG. 1.
Figure 3:
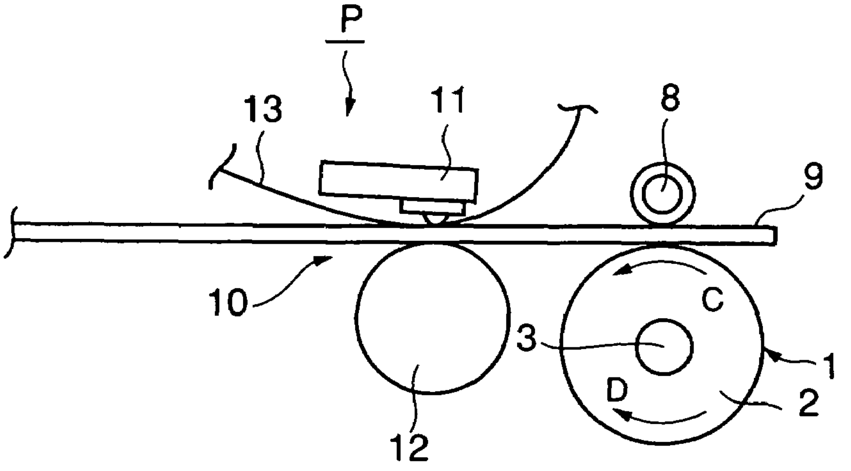
FIG. 3 is a view schematically illustrating a recording apparatus according to the present invention.
Figure 8:
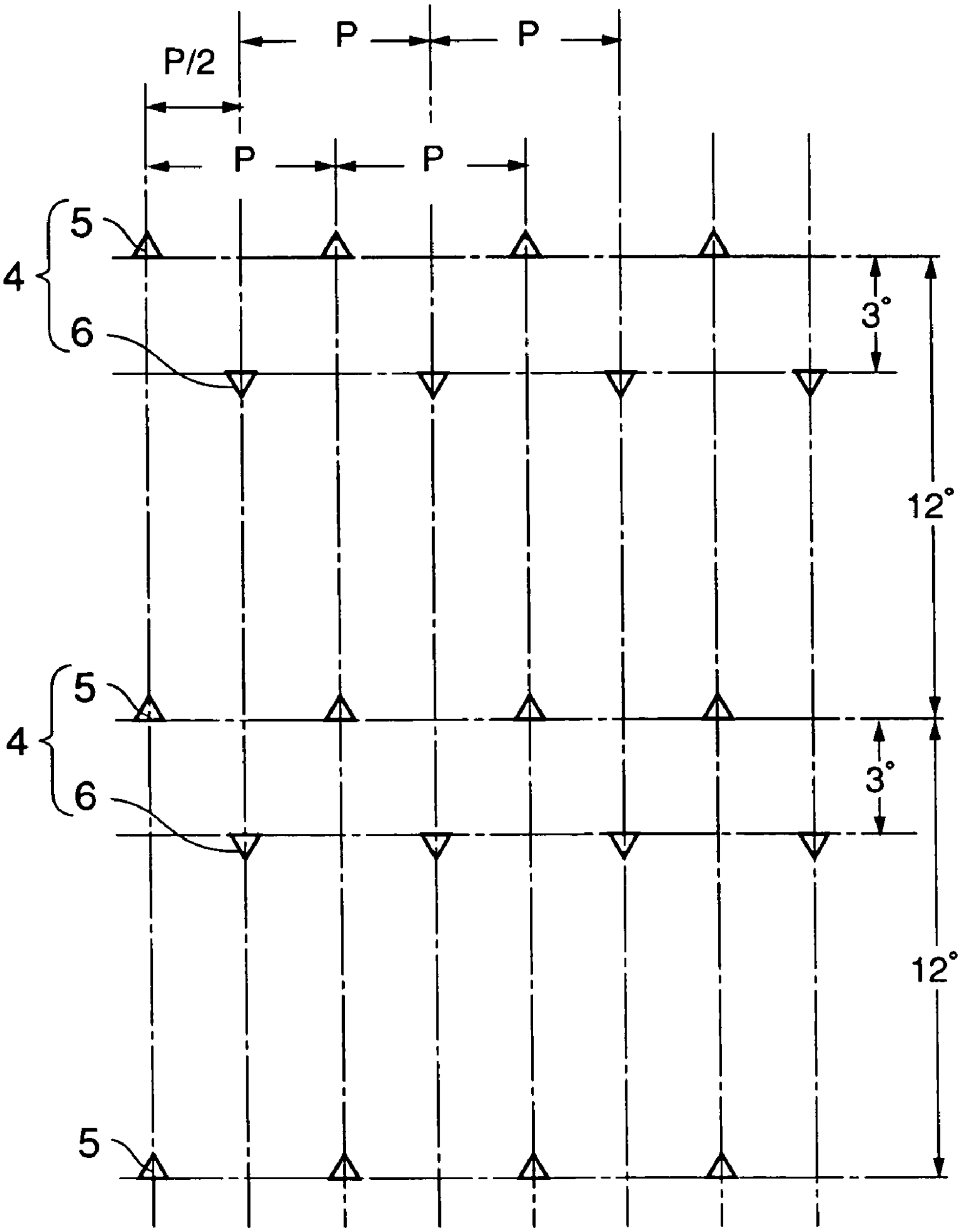
FIG. 8 is a view schematically illustrating an arrangement of projections formed by a first projection forming operation of the manufacturing method according to the present invention.
Figure 9:
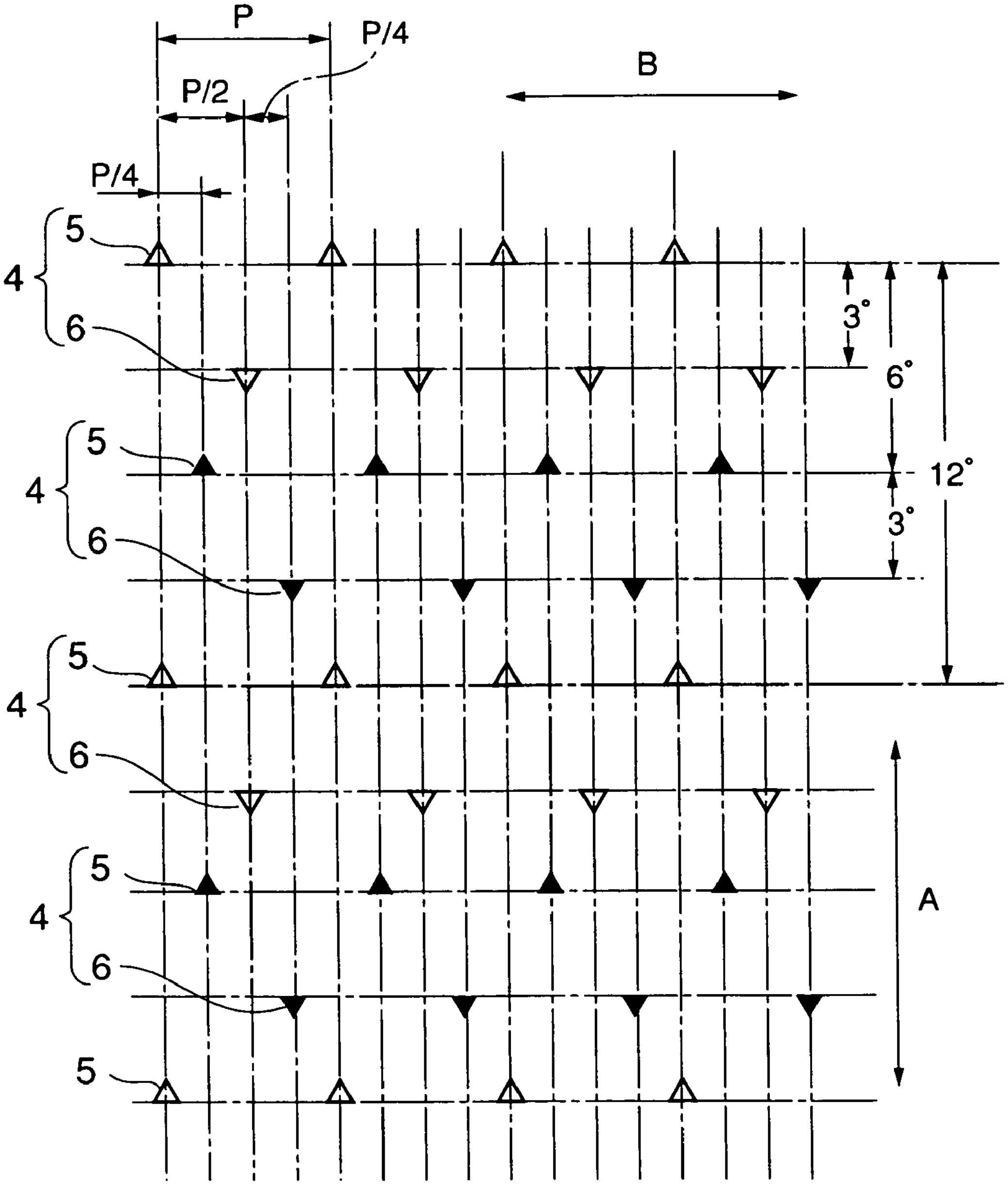
FIG. 9 is a view schematically illustrating the arrangement of the projection formed by the first and second projection forming operations of the manufacturing method according to the present invention.
Figure 10:
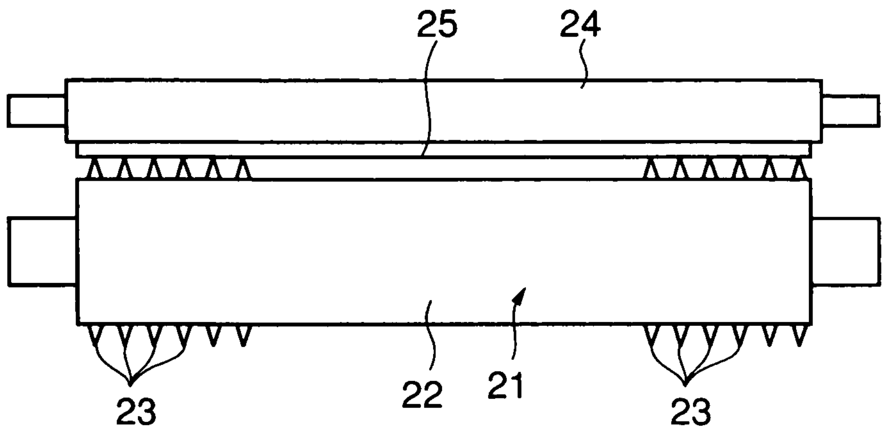
FIG. 10 PRIOR ART
FIG. 10 is a view illustrating a carrying mechanism in which a conventional sheet feed roller is used.
Figure 11:
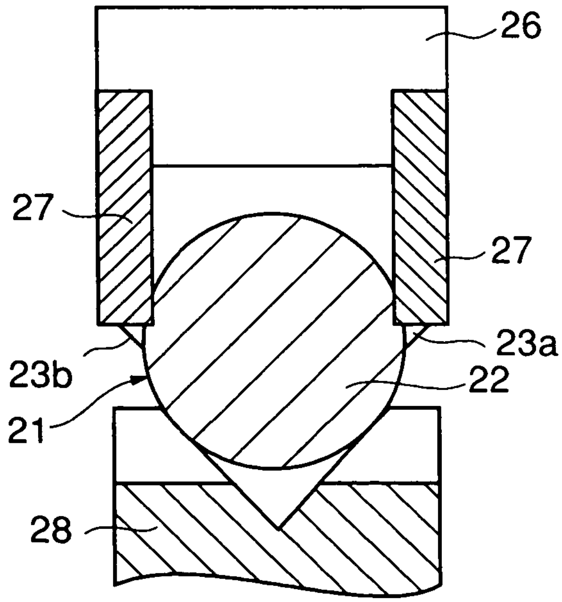
FIG. 11 PRIOR ART
FIG. 11 is a cross-sectional view illustrating a method of manufacturing the conventional sheet feed roller.
Figure 12:
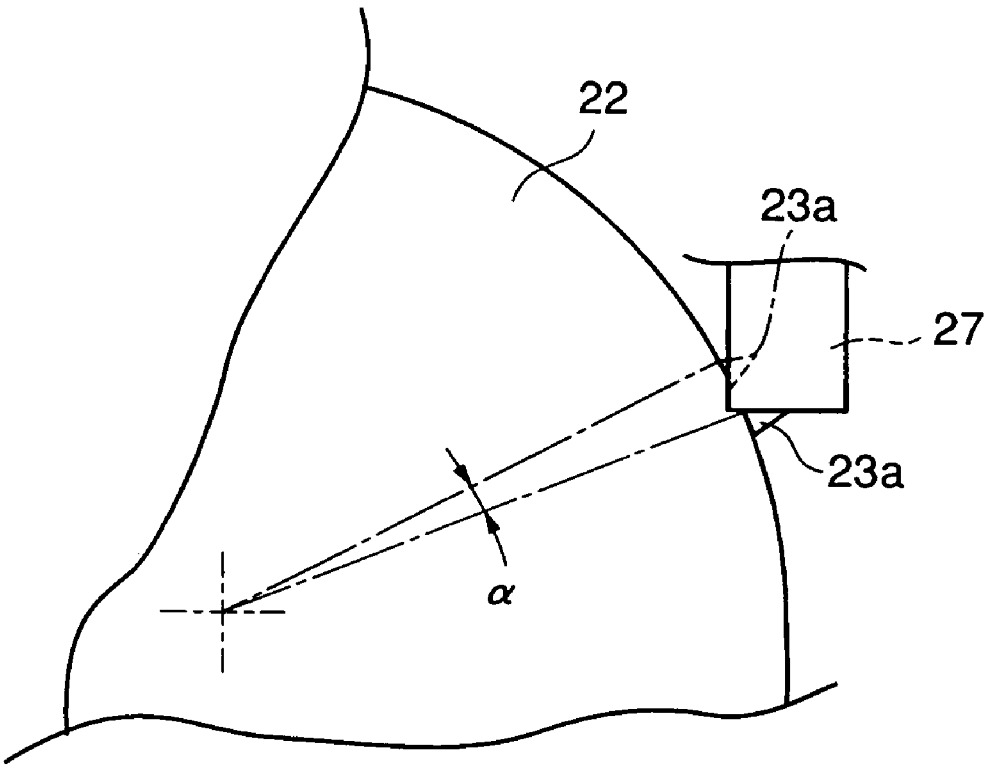
FIG. 12 PRIOR ART
FIG. 12 is an enlarged view illustrating the main part of the conventional sheet feed roller.
Figure 13:
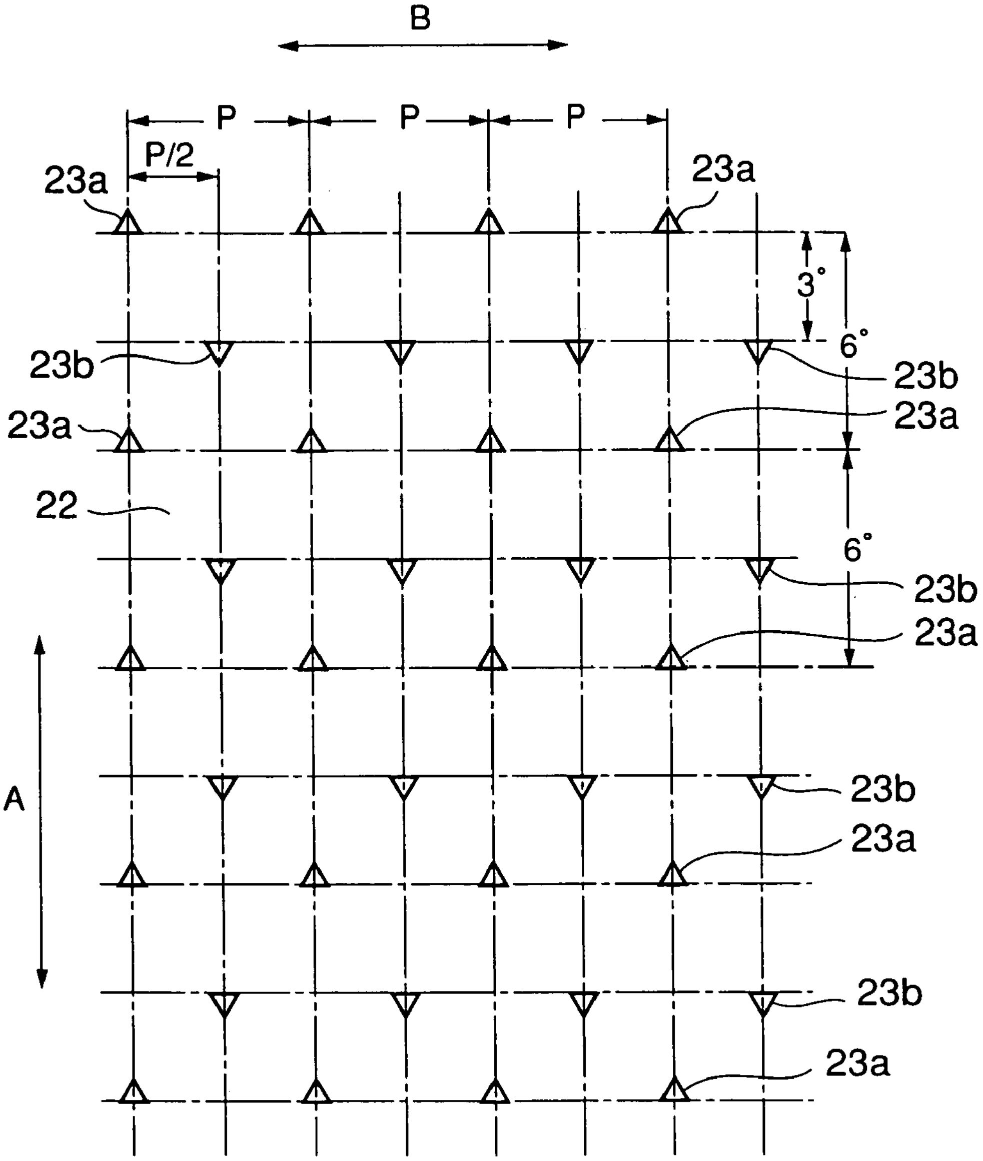
FIG. 13 PRIOR ART
FIG. 13 is a view schematically illustrating the arrangement of the projections formed by a conventional manufacturing method.

A sheet feed roller according to the present invention will now be illustrated with reference to FIGS. 1 to 9. FIG. 1 is a front view of the sheet feed roller according to the present invention; FIG. 2 is a side view of the sheet feed roller shown in FIG. 1; FIG. 3 is a view schematically illustrating a recording apparatus according to the present invention; FIGS. 4 to 7 are views illustrating a method of manufacturing the sheet feed roller according to the present invention; FIG. 8 is a view schematically illustrating an arrangement of projections formed by a first projection forming operation; and FIG. 9 is a view schematically illustrating the arrangement of the projections formed by the first and second projection forming operations.

First, as shown in FIG. 1, a sheet feed roller 1 according to the present invention comprises a cylindrical metal roller portion 2 and a rotating shaft portion 3 protruding from both ends of the roller portion 2. In addition, a plurality of projections 4 of a predetermined height is formed on the circumferential surface of the roller portion 2 in the circumferential direction, that is, in the direction of arrow A, and in the axial direction, that is, in the direction of arrow B.

The projections 4 are composed of straight grain projections 5 and reverse grain projections 6, and the projecting direction of the straight grain projections 5 is opposite to that of the reverse grain projections 6. The outer circumferential surface of the projection 5 or 6 is composed of a surface (a projecting surface) 5_a_ or 6_a_ that is cut and raised by a protruding blade 14_b_ or 15_b_ of a first or second punch 14 or 15, which will be described later, and the other surface 5_b_ or 6_b_ extending from the projecting surface 5_a_ or 6_a_ back to back therewith. Therefore, the projections 4 each have an acute front end.

Further, the projecting surfaces 5_a_ of the straight grain projections 5 are formed facing in the rotation direction of the roller portion 2, that is, in the direction of arrow C, and the projecting surfaces 6_a_ of the reverse grain projections 6 are formed facing in the reverse rotation direction of the roller portion 2, that is, in the direction of arrow D (in the direction opposite to the projecting surfaces 5_a_ of the straight grain projections 5).

Further, the straight grain projections 5 that are adjacent to each other in the axial direction of the roller portion 2 are formed in two rows or more in the circumferential direction of the roller portion 2.

In addition, the reverse grain projections 6 that are adjacent to each other in the axial direction of the straight grain projections 5 are formed in two rows or more in the circumferential direction of the roller portion 2.

As shown in FIG. 9, the straight grain projections 5 and the reverse grain projections 6 each formed in two rows or more are formed in a zigzag shape in which the projections 5 and 6 are spaced from each other by predetermined intervals in the circumferential direction, that is, in the direction of arrow A, and in the axial direction, that is, in the direction of arrow B.

Next, an example in which a thermal transfer printer is used as a recording apparatus equipped with such a sheet feed roller 1 will be described. As shown in FIG. 3, in a thermal transfer printer P, a cylindrical pressure roller 8 made of a metallic material is provided parallel to the axial direction of the roller portion 2 of the sheet feed roller 1, and the pressure roller 8 is elastically forced by a coil spring (not shown) to come into pressure contact with the plurality of projections 4 on the roller portion 2.

Furthermore, a sheet 9, which may include thick paper, such as photographic paper, is inserted and pressed between the pressure roller 8 and the roller portion 2 of the sheet feed roller 1. The desired image is recorded on one surface of the sheet 9 with which the pressure roller 8 comes into contact by a recording portion 10, which will be described later.

In addition, the sheet feed roller 1 feeds the sheet 9 by gripping the surface of the sheet 9 that faces the roller portion 2 using the plurality of projections 4.

In this state, the sheet feed roller 1 is rotated in the direction of arrow C to carry the sheet 9 to the recording portion 10 without the slippage of the sheet 9.

The recording portion 10 comprises a recording head 11 that is composed of a thermal head and that is provided above the sheet 9 to be carried, and a platen roller 12 that is rotatably provided below the recording head 11.

Further, an ink ribbon 13 is drawn between the recording head 11 and the platen roller 12, and an ink surface composed of the desired colors is formed on one surface of the ink ribbon 13, which is shown as the lower surface in FIG. 3, so that ink can be transferred to the sheet 9 by the recording head 11.

One end of the ink ribbon 13 is wound on a take-up reel (not shown), and the other end thereof is wound on a supply reel (not shown). Therefore, the ink ribbon 13 can be wound from the left to the right in FIG. 3.

In the image recording operation in which the desired image is recorded on the sheet 9 by such a thermal transfer printer P, first, the recording head 11 is raised up to separate from the platen roller 12.

In this state, the sheet feed roller 1 is rotated in the direction of arrow C so that the sheet 9 is fed between the recording head 11 and the platen roller 12 (in the left direction of FIG. 3).

Then, the sheet 9 gripped by the plurality of projections 4 of the sheet feed roller 1 is carried in the left direction of FIG. 3 by a predetermined distance. At this time, a large carrying force is generated by the projecting surfaces 5*a* of the straight grain projections 5 and by the surfaces 6*b* of the reverse grain projections 6, and thus the sheet 9 is carried in the left direction of FIG. 3 by both the straight grain projections 5 and the reverse grain projections 6.

When the sheet 9 is carried in the left direction of FIG. 3 by a predetermined distance, the recording head 11 moves down so that the ink ribbon 13 comes into pressure contact with the sheet 9 on the platen roller 12.

At the same time, a plurality of heating elements (not shown) of the recording head 11 is selectively heated based on printing information, and the sheet feed roller 1 is rotated in the direction of arrow D to move the sheet 9 in the right direction of FIG. 3.

At this time, a large carrying force is generated by the surfaces 6*a* of the reverse grain projections 6 and the surfaces 5*b* of the straight grain projections 5, and thus the sheet 9 is carried in the right direction of FIG. 3 by all the reverse grain projections 6 and the straight grain projections 5.

Then, the ink of the ink ribbon 13 is thermally transferred to one surface of the sheet 9, thereby recording the desired image thereon. Subsequently, when the sheet feed roller 1 is further rotated in the direction of arrow D, the pressure contact between the sheet feed roller 1 and the pressure roller 8 is released, and the printed sheet 9 is discharged toward the outside of the thermal transfer printer P.

In addition, when a color image is recorded on the sheet 9, a color ink ribbon 13 on which different color inks are sequentially formed is used. In this case, the different color inks of the ink ribbon 13 are printed on the sheet 9 so as to overlap with each other while the sheet 9 is reciprocated using the sheet feed roller 1, thereby recording the desired color image on the sheet 9.

Figure 4:
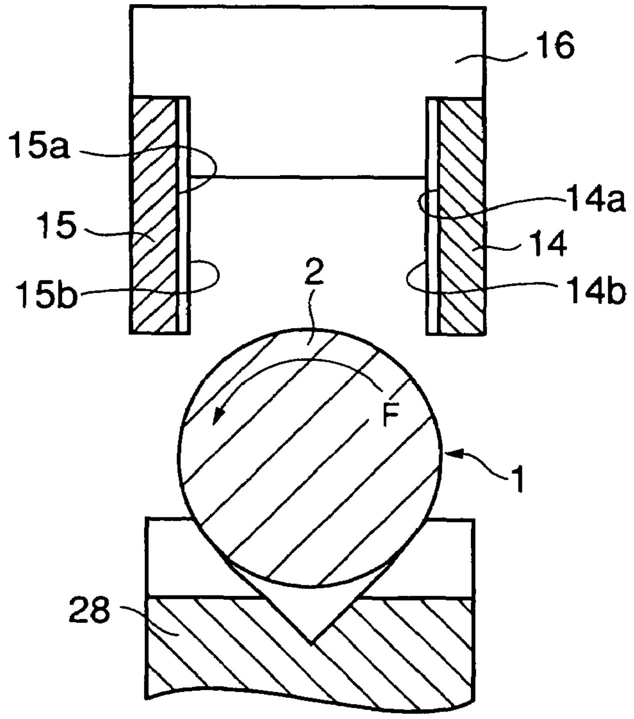
FIG. 4 is a view illustrating a method of manufacturing the sheet feed roller according to the present invention.

Next, a method of manufacturing the sheet feed roller 1 according to the present invention will be described. As shown in FIG. 4, first, the sheet feed roller 1 is mounted on a V-shaped supporting stand 28, which is the same as that described in the Description of the Related Art.

In the sheet feed roller 1 mounted on the supporting stand 28, one end thereof in the longitudinal direction is supported by a rotary drive source (not shown), such as a stepping motor, so that the sheet feed roller 1 can be intermittently rotated by a predetermined rotation angle.

Figure 5:
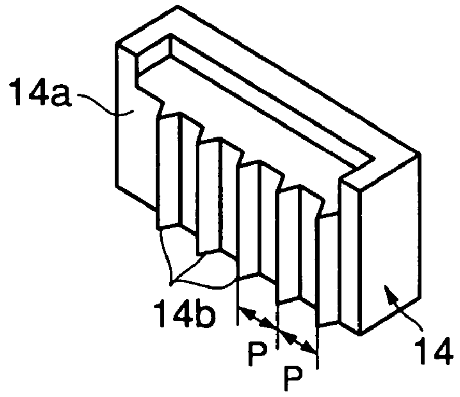
FIG. 5 is a view illustrating the method of manufacturing the sheet feed roller according to the present invention.

In addition, a first punch 14 and a second punch 15 are mounted to a punch holder 16 to form a united body, which is provided above the supporting stand 28. As shown in FIG. 5, the first punch 14 comprises a flat cross-section portion 14*a* and a plurality of saw-tooth protruding blades 14*b* of a predetermined height that is formed with a predetermined pitch P.

Figure 7:
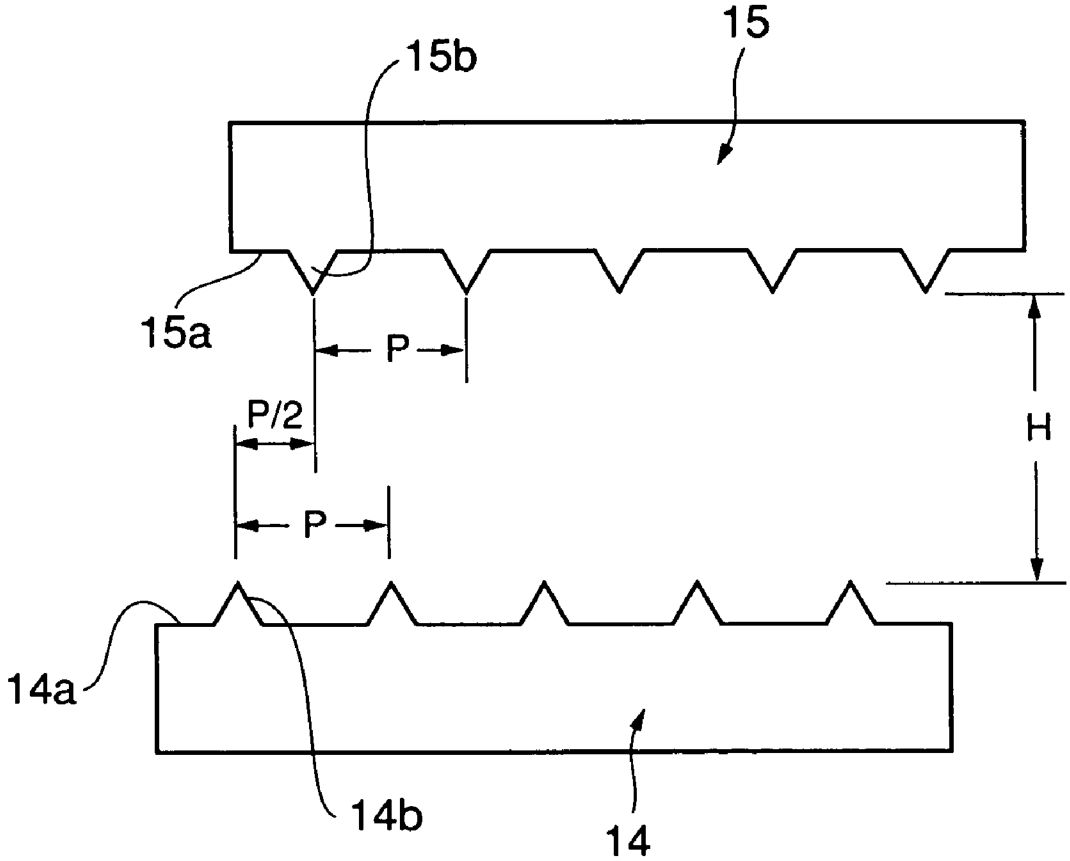
FIG. 7 is a view illustrating the method of manufacturing the sheet feed roller according to the present invention.

Further, as shown in FIG. 7, the second punch 15 is opposite to the first punch 14 at an interval H that is smaller than the diameter of the roller portion 2 of the sheet feed roller 1. In addition, the second punch 15 comprises a flat cross-section portion 15*a* and a plurality of saw-tooth protruding blades 15*b* that is formed with the pitch P, whose shapes are the same as those of the first punch 14.

As shown in FIG. 7, the first and second punches 14 and 15 are supported by the punch holder 16 in a state in which the protruding blades 14*b* of the first punch 14 deviate from the protruding blades 15*b* of the second punch 15 by a predetermined dimension (P/2) in the axial direction of the sheet feed roller 1.

As shown in FIG. 4, the sheet feed roller 1 on which the projections 5 and 6 are not formed yet is mounted on the supporting stand 28, and one end of the sheet feed roller 1 is supported by a rotary drive source (not shown), such as a stepping motor. At this time, the first and second punches 14 and 15 are located at a raised position that is higher than the sheet feed roller 1 by a predetermined height.

Figure 6:
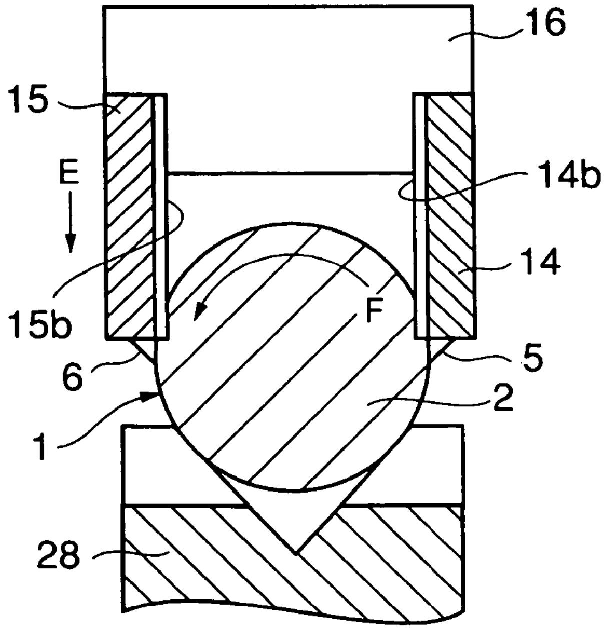
FIG. 6 is a view illustrating the method of manufacturing the sheet feed roller according to the present invention.

Then, as shown in FIG. 6, when a punching operation is performed in which the first and second punches 14 and 15 located at the raised position are dropped in the direction of arrow E with a predetermined stroke, a plurality of the straight grain projections 5 and the reverse grain projections 6 with a predetermined pitch P are formed on the circumferential surface of the roller portion 2 opposite to each other in the axial direction, that is, in the direction of arrow B.

The straight grain projections 5 are spaced from the reverse grain projections 6 by P/2 in the axial direction of the roller portion 2.

The punching operation and a rotating operation in which the sheet feed roller 1 is intermittently rotated by, for example, 12° in the direction of arrow C while the first and second punches 14 and 15 are raised to the raised position in synchronism with the punching operation are repeatedly performed until the sheet feed roller 1 makes one revolution.

Then, rows of thirty straight grain projections 5 and rows of thirty reverse grain projections 6, each row including projections that are adjacent to each other with a predetermined pitch P in the axial direction, are simultaneously formed on the circumferential surface of the roller portion 2.

That is, as shown in FIG. 8, a plurality of projections 4 is formed on the outer circumferential surface of the roller portion 2 in the circumferential direction and in the axial direction by repeatedly performing a first projection forming operation that includes the punching operation by the first and second punches 14 and 15 and the rotating operation in which the sheet feed roller 1 is sequentially rotated by a predetermined angle.

In addition, as shown in FIG. 8, the deviation in the rotation angle between the reverse grain projection 6 and the straight grain projection 5 is, for example, 3°, and the deviation in distance in the axial direction between the reverse grain projection 6 and the straight grain projection 5 is P/2.

After the first projection forming operation, the sheet feed roller 1 deviates in the axial direction by a predetermined distance, for example, P/4, and the rotation angle thereof deviates by 6°, as shown in FIG. 9. In this state, by repeatedly performing a second projection forming operation, which is the same as the first projection forming operation, black-painted straight grain projections 5 are formed in the circumferential direction at intervals of 12° between the straight grain projections 5 and the reverse grain projections 6 that have been formed adjacent to each other in the axial direction by the first projection forming operation.

In addition, black-painted reverse grain projections 6 are formed in the circumferential direction at intervals of 12° between the reverse grain projections 6 and the straight grain projections 5.

In this way, in the plurality of projections 4 formed by the first and second projection forming operations, the straight grain projections 5 adjacent to each other in the axial direction are formed in two rows in the circumferential direction, and the reverse grain projections 6 adjacent to each other in the axial direction of the straight grain projections 5 are formed in two rows in the circumferential direction.

Furthermore, a deviation in the rotation angle between the straight grain projection 5 formed in the second projection forming operation and the straight grain projection 5 formed in the first projection forming operation is 6°, and a deviation in distance in the axial direction therebetween is P/4.

Moreover, similar to the above, a deviation in the rotation angle between the reverse grain projections 6 formed in the second projection forming operation and the reverse grain projections 6 formed in the first projection forming operation is 6°, and a deviation in distance in the axial direction therebetween is P/4.

That is, the straight grain projections 5 and the reverse grain projections 6 that are adjacent to each other in the axial direction of the roller portion 2 are formed in a zigzag shape in which the projections 5 and 6 are arranged at predetermined intervals in the axial direction and in the circumferential direction.

Therefore, as shown in FIG. 9, the straight grain projections 5 or the reverse grain projections 6 that are adjacent to each other in the axial direction can be minutely formed such that the distance in the axial direction between the projections 5 and 6 is P/4 and the rotation angle between the projections 5 and 6 is 3°. Thus, it is possible to increase the number of projections 4 gripping the carrying sheet 9 per unit area, and thus to increase the grip force on the sheet 9 in a carrying state.

In addition, at the time of forming the projections 4, the punches 14 and 15 do not interfere with the previously formed projections 4, in contrast to the conventional method. Therefore, it is possible to heighten the projections 4 up to the desired height, and thus to reliably grip the sheet 9.

Therefore, even when a large carrying load is imposed on the sheet 9 at the time of recording an image on the sheet 9 using the recording head 11, it is possible to reliably carry the sheet 9 and thus to record a fine image on the sheet 9.

However, according to an embodiment of the present invention, the straight grain projections 5 and the reverse grain projections 6 that are adjacent to each other in the axial direction are formed in two rows, respectively, but the straight grain projections 5 and the reverse grain projections 6 are formed in three rows or more in the axial direction, respectively.

That is, the straight grain projections 5 and the reverse grain projections 6 that are adjacent to each other in the axial direction may be formed in two rows or more, respectively.

In addition, the straight grain projections 5 and the reverse grain projections 6 that are formed by the first projection forming operation may be formed so as to be adjacent to each other on the same line in the axial direction, but so as not deviate from each other in the rotating direction.

In other words, the straight grain projections 5 and the reverse grain projections 6 may not be formed in a zigzag shape, that is, may be formed on the same line in the axial direction.

Furthermore, in the sheet feed roller 1 and the method of manufacturing the same according to the present invention, the projections 4 are formed on the surface of the sheet feed roller 1 by the first projection forming operation, and the second projection forming operation is then performed thereon with the sheet feed roller 1 moved in the axial direction by a predetermined distance (P/4). However, the first and second punches 14 and 15 may be moved in the axial direction without moving the sheet feed roller 1.

Moreover, although not shown in figures, each reverse grain projection 6 may be formed by the first projection forming operation so as to be spaced from the straight grain projection 5 by P/3 in the axial direction, and each straight grain projection 5 may be formed within the space 2P/3 between the reverse grain projection 6 and the straight grain projection 5 by the second projection forming operation.

As described above, the straight grain projections formed on the sheet feed roller according to the present invention are adjacent to each other in the axial direction of the roller portion and are also formed in two rows or more in the circumferential direction thereof. In addition, the reverse grain projections adjacent to each other in the axial direction of the straight grain projections are formed in the circumferential direction. Therefore, even when the interval between the straight grain projections or the reverse grain projections that are adjacent to each other in the circumferential direction is increased up to an interval at which the punches do not interfere with the projections, the number of projections gripping the sheet per unit area can be increased, and thus the sheet can reliably be gripped, thereby accurately carrying the sheet without generating a carriage error.

In addition, since the straight grain projections and the reverse grain projections which are adjacent to each other in the axial direction are formed in a zigzag shape in which the projections are arranged at predetermined intervals in the axial direction and in the circumferential direction, the grip force of the projections on the sheet can be dispersed, and it is possible to accurately carry the sheet without generating a carriage error of the sheet.

Furthermore, according to the method of manufacturing the sheet feed roller of the present invention, the sheet feed roller is moved in the axial direction thereof by a predetermined distance after the first projection forming operation, and, by the second projection forming operation which is the same as the first projection forming operation, additional projections are then formed in the circumferential direction between the projections that have been formed so as to be adjacent to each other in the axial direction by the first projection forming operation. Therefore, even when the pitch in the axial direction between the additionally formed projections is decreased, the punches do not interfere with the previously formed projections.

Accordingly, the number of projections gripping the sheet per unit area can be increased, and thus the sheet can be stably carried.

In addition, according to the present invention, a plurality of the straight grain projections and reverse grain projections are formed in the circumferential direction in a state in which the projections are adjacent to each other in the axial direction by the first projection forming operation, and, between the straight grain projections and the reverse grain projections that are formed by the first projection forming operation, additional straight grain projections or reverse grain projections are formed in the circumferential direction by the second projection forming operation. Therefore, the number of projections gripping the sheet per unit area can be increased, and thus the sheet can be stably carried.

Furthermore, the additionally formed straight grain projections or reverse grain projection by the second projection forming operation are formed in a zigzag shape with respect to the straight grain projections and reverse grain projection formed by the first projection forming operation. Therefore, the grip force of the projections on the sheet can be dispersed, and it is possible to accurately carry the sheet without generating a carriage error of the sheet.

What is claimed is:

1. A method of manufacturing a sheet feed roller, comprising the steps of:

providing a pair of punches composed of a first punch and a second punch, the first and second punches being opposite to each other at an interval smaller than a diameter of a cylindrical metal roller;

repeatedly performing, in a state in which the metal roller is supported by a supporting stand, a first projection forming operation including a punching operation by the first and second punches and a rotating operation in which the metal roller is sequentially rotated by a predetermined rotation angle in synchronism with the punching operation to form a plurality of projections in a circumferential direction and in an axial direction on a circumferential surface of the metal roller, the plurality of projections formed by the first punches having a pitch; and moving the metal roller in the axial direction by a predetermined distance, which is smaller than the pitch, and in a rotation direction by a predetermined rotation angle after the first projection forming operation, and repeatedly performing a second projection forming operation which is the same as the first projection forming operation to form additional projections in the circumferential direction between the projections that have been formed so as to be adjacent to each other in the axial direction.

2. The method of manufacturing the sheet feed roller according to claim 1, wherein the projections formed by the first punch are straight grain projections whose projecting direction is equal to a rotation direction of the metal roller, wherein the projections formed by the second punch are reverse grain projection whose projecting direction is opposite to the rotation direction of the metal roller, wherein, by the first projection forming operation, a plurality of the straight grain projections and the reverse grain projections is formed in the circumferential direction in a state in which the plurality of projections is adjacent to each other in the axial direction, and wherein, by the second projection forming operation, additional straight grain projections or reverse grain projections are formed in the circumferential direction between the straight grain projections and the reverse grain projections that are formed so as to be adjacent to each other in the axial direction.

3. The method of manufacturing the sheet feed roller according to claim 2, wherein the straight grain projections or the reverse grain projections additionally formed by the second projection forming operation are formed in a zigzag shape in which they are spaced from the straight grain projections or the reverse grain projections formed by the first projection forming operation in the axial direction and in the circumferential direction by predetermined intervals.

* * * * *

UNITED STATES PATENT AND TRADEMARK OFFICE

CERTIFICATE OF CORRECTION

PATENT NO. : 7,370,418 B2
APPLICATION NO. : 10/865151
DATED : May 13, 2008
INVENTOR(S) : Kazuo Ueda et al.

It is certified that error appears in the above-identified patent and that said Letters Patent is hereby corrected as shown below:

On the Title Page

In column 2, line 1, under "ABSTRACT", after "Projections" delete "4-formed" and substitute --formed-- in its place.

Signed and Sealed this

Twenty-eighth Day of October, 2008

JON W. DUDAS
*Director of the United States Patent and Trademark Office*